United States Patent [19]

Beck et al.

[11] 4,375,768

[45] Mar. 8, 1983

[54] ELECTRONIC CIRCUIT FOR PROCESSING THE MEASURED VALUES FROM A VORTEX SEQUENCE PRODUCED BY A KARMAN VORTEX PATH

[75] Inventors: Martin Beck, Nordenham; Wolfgang Höht; Udo Mushold, both of Berlin, all of Fed. Rep. of Germany

[73] Assignee: Auergesellschaft GmbH, Berlin, Fed. Rep. of Germany

[21] Appl. No.: 274,520

[22] Filed: Jun. 17, 1981

[51] Int. Cl.³ .............................................. G01F 1/32
[52] U.S. Cl. ................................................ 73/861.23
[58] Field of Search ............ 73/861.22, 861.23, 861.34

[56] References Cited

U.S. PATENT DOCUMENTS 3,818,877  6/1974  Barrera et al. ................ 73/861.23 X
4,318,303  3/1982  Harrington ....................... 73/861.23

Primary Examiner—Charles A. Ruehl
Attorney, Agent, or Firm—Brown, Flick & Peckham

[57] ABSTRACT

An electronic circuit for processing measured values obtained from a vortex sequence produced by a Karman vortex path, wherein the ultrasonically sensed signals are processed both digitally in a first circuit branch for a computer and analogously in a second circuit branch for the connection of a two-channel continuous recorder. An adjustable frequency transforming arrangement is serially connected in the computer branch for balancing the circuit, and an additional frequency-voltage converter and and integrator are serially connected in the recorder branch along with a control logic circuit inserted between the two branches for starting the recorder after activation of the computer only when signals which can be evaluated are present.

7 Claims, 1 Drawing Figure

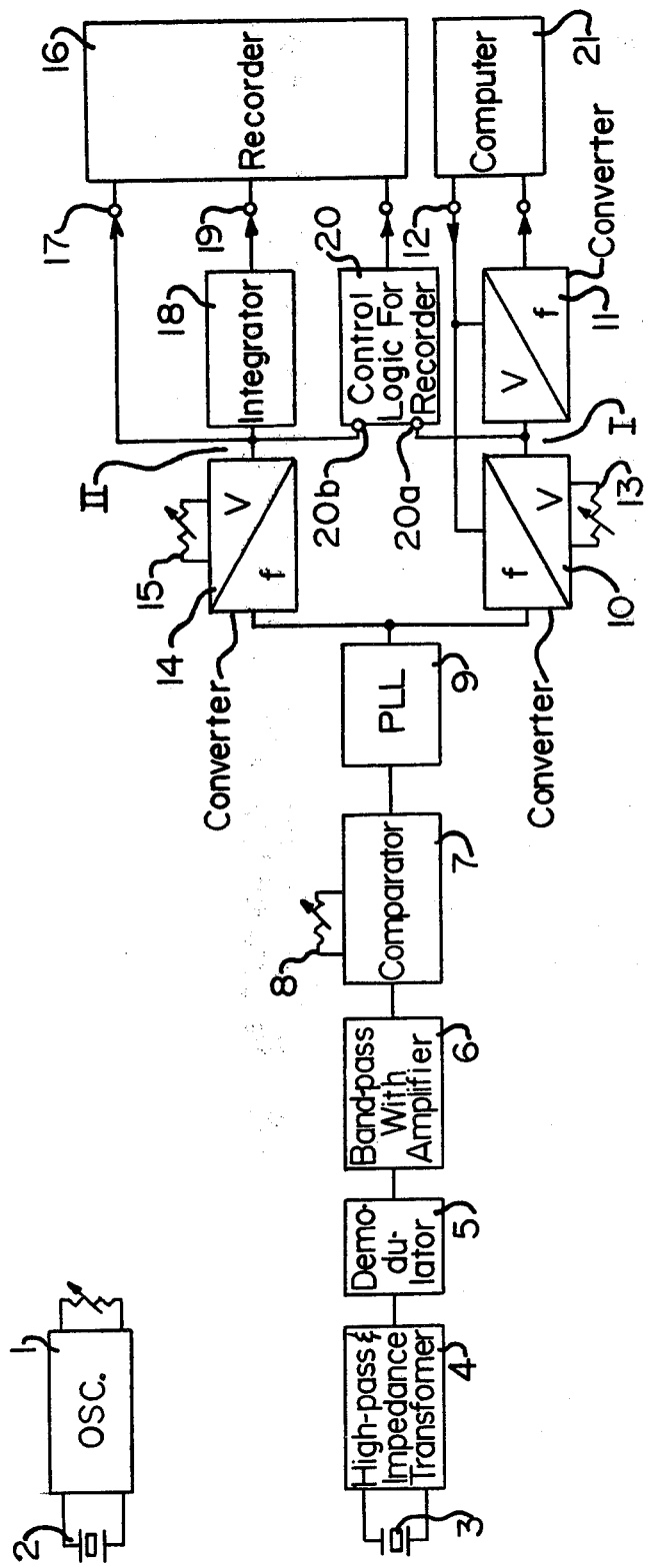

ELECTRONIC CIRCUIT FOR PROCESSING THE MEASURED VALUES FROM A VORTEX SEQUENCE PRODUCED BY A KARMAN VORTEX PATH

The invention concerns a circuit for processing the measured values obtained from a vortex sequence produced by a Karman vortex path.

For the measurement of transducer vortices produced by the Karman vortex path, it is known practice to arrange an ultrasonic transmitter and an ultrasonic receiver to face each other on the pipe-line through which the medium to be measured is flowing, so that the ultrasonic waves radiated by the transmitter are modulated by the vortices in the Karman vortex path and are then received by the ultrasonic receiver and evaluated by the succeeding electronics. For example, see U.S. Pat. No. 3,680,375 issued Aug. 1, 1972.

Based on the above, the basic task of the invention is to create an electronic circuit for a transducer, by means of which the vortex sequence produced by the Karman vortex path and sensed ultrasonically can be processed electronically both digitally for a microcomputer and analogously for the connection of a two-channel continuous line-drawing recorder.

The problem set by this task resides in the fact that the transmitting frequency radiated from the transmitter is subjected to intensity changes caused by the sequence of vortices produced by the Karman vortex path and, at the output to the computer to be connected to the transducer, there must occur a frequency which corresponds to a previously specified constant flow throughput, and to which the computer responds. In addition, there should be provided an analog output for connecting to a two-channel continuous line-drawing recorder which simultaneously traces flow and volume curves. The problem is such that it is necessary to begin with a specified optimum transmitting frequency so that a specified impulse sequence (or pulse train) occurs at the transducer's digital output, the said impulse sequence corresponding to a specified constant flow-rate.

The advantages obtained with the invention reside, in particular, in the fact that the circuit makes it possible to match the transducer over wide limits to the succeeding computer, and that the likewise succeeding recorder is only activated by a suitable signal.

In the following, the mode of operation of the equipment will be described on the basis of the appended FIGURE which presents a block diagram of the circuit arranged in accordance with the invention.

An amplitude and frequency-constant signal is emitted by a transmitter which consists of an oscillator 1 and a piezoelectric transducer 2, the arrangement being such that the oscillator 1 oscillates at the resonance frequency of the piezoelectric transducer 2 connected to the oscillator.

The vortices in the flowing medium, which are produced by the Karman vortex path, produce an amplitude modulation in the transmission frequency. The frequency spectrum, which depends on the flow-rate of the flowing medium, lies in the low frequency region. In order to achieve favorable sensing behavior, the transmitting frequency must be appreciably higher than that of the low frequency region.

In order to attain a power matching, an additional piezoelectric transducer 3, which serves as a receiver, must oscillate at the resonance frequency with the amplitude of the ultrasonic signal.

Coming from the receiver 3, the high ohmic input signal passes through an impedance transformer (or converter) 4 whose task is to match the "receiver quartz" of receiver 3 to a demodulator 5. The demodulator 5 demodulates the modulated transmitter signal, so that the low-frequency frequency spectrum produced by the vortices is obtained.

The low frequency modulation oscillations, whose frequency contains the measured value, appear at the output of the demodulator 5. Because the degree of modulation depends on the speed of the flowing medium, the demodulated low frequency passes through an amplifier 6 with a band-pass, the band-pass serving preferentially to amplify the evaluatable low frequency region and to suppress the residue of the carrier frequency.

The amplified amplitude is fed to a comparator 7 which, on the one hand, suppresses any spurious signals which might be present (such as, for example, amplifier noise) and, on the other hand, converts into square waves the low frequency sinusoidal oscillations which arrive at the input to the comparator. The trigger threshold of the comparator 7 can be adjusted by means of a potentiometer 8, so that, by this means, the lower response threshold for the speed of the flowing medium can be advantageously adjusted.

A PLL circuit (phase-locked loop) 9 succeeds the comparator 7 in order to improve the sensing behavior of the squarewave impulses and to sieve out a mean value from the low-frequency frequency spectrum.

In order for the circuit to be balanced, the frequency is advantageously converted into a voltage at a specified value of the speed of the flowing medium. This is effected by means of a frequency-converting arrangement which follows the PLL circuit and which consists of a frequency-voltage converter 10 and a voltage-frequency converter 11.

By means of the frequency-voltage converter 10, the measurement frequency is converted into a frequency-dependent direct current voltage and the latter is converted back again by the voltage-frequency converter 11 into a frequency which can be adjusted to the required frequency value and which should be present in the form of square wave impulses at the input 12 of the computer 21. This adjustment, and hence the calibration of the transducer at the computer 21, is effected by means of an additional potentiometer 13 which can vary the output voltage of the frequency-voltage converter 10 between wide limits in order to obtain the required output frequency from the voltage-frequency converter 11.

Arranged in parallel with the frequency-voltage converter 10 of the computer branch I is an additional frequency-voltage converter 14 which is provided with a potentiometer 15 for adjusting the output voltage. The frequency-dependent output voltage is applied to the inputs of a two-channel compensation recorder 16, on the one hand directly to the input 17 to record the flow curves and on the other hand, via an integrator 18 to the input 19, to draw the volume curve. By these means, it is possible advantageously to plot non-reproducible speed and/or volume profiles as flow and volume curves in one coordinate system.

A control logic 20 which consists of an AND circuit and which is connected between the computer branch I and the recorder branch II is provided to ensure that the recorder 16 only starts when the measurement signals caused by a flowing medium are present. The recorder 16 starts when a measurement signal is applied to the input 20a of the control logic 20 by the activation of the computer by the frequency-voltage converter 10, and to the other input 20b of the control logic 20 by the frequency-voltage converter 14 of the recorder branch II.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. An electronic circuit for processing the measured values obtained from a vortex sequence produced by a Karman vortex path, the circuit incorporating:
   (a) an oscillator which excites an electro-acoustic transducer and acts as a transmitter,
   (b) a receiver for receiving signals transmitted from said transmitter,
   (c) an amplifier connected in series with said receiver and a demodulator, along with
   (d) a data handling circuit for evaluating of signals received therefrom, characterized by
   (e) a comparator connected in series with said amplifier, the comparator having a trigger threshold for suppressing spurious signals and for converting sinusoidal input signals into square wave signals,
   (f) a PLL-circuit connected in series with said comparator for filtering-out a mean value from the low frequency frequency spectrum and for improving the pulse width-repetition ratio of the square wave impulses,
   (g) a parallel connected computer branch I and recorder branch II connected in series with the PLL-circuit,
   (h) an adjustable frequency transforming arrangement connected in series in the computer branch with the computer for balancing the circuit, and consisting of a frequency-voltage converter and a voltage-frequency converter,
   (i) an additional adjustable frequency-voltage converter connected in the recorder branch in series with the recorder and an integrator, along with
   (j) a control logic inserted between the computer branch and the recorder branch and which, after activating the computer, starts the recorder only when signals which can be evaluated are present.

2. A circuit in accordance with claim 1, characterized by circuit means 13, 15 for independently balancing the computer branch and the recorder branch.

3. A circuit in accordance with claim 1, characterized by a potentiometer connected to adjust the trigger threshold of the comparator.

4. A circuit in accordance with claim 1 or 2, characterized in that said frequency-voltage converter in the computer branch is provided with a potentiometer with which the transducer circuit is calibrated with the computer input of the computer.

5. A circuit in accordance with claim 1 or 2, characterized in that said frequency-voltage converter in the recorder branch incorporates a potentiometer by means of which the frequency-dependent output voltage at the inputs of the two-channel compensation recorder is adjusted.

6. A circuit in accordance with claim 1, characterized in that the control logic consists of an AND circuit.

7. A circuit in accordance with claim 1, characterized in that there is provided an analog output for the connection to the two-channel continuous line recorder which simultaneously traces flow and volume curves in one coordinate system.

* * * * *